No. 801,160. PATENTED OCT. 3, 1905.
J. SCHREVEN.
HARNESS.
APPLICATION FILED JAN. 12, 1905.

Witnesses
William Essenwein
Peter Rieber

Inventor
Johann Schreven

UNITED STATES PATENT OFFICE.

JOHANN SCHREVEN, OF GELDERN, GERMANY.

HARNESS.

No. 801,160.  Specification of Letters Patent.  Patented Oct. 3, 1905.

Application filed January 12, 1905. Serial No. 240,772.

*To all whom it may concern:*

Be it known that I, JOHANN SCHREVEN, a citizen of the German Empire, and a resident of Geldern'schestrasse 8, Geldern, Rhineland, Germany, have invented certain new and useful Improvements in Harness, of which the following is a specification.

In the harness heretofore in use for draft-animals the traces were apt to go down very near to the ground or even drag along on the same whenever the vehicle assumed a greater speed than the animals, as in descending a grade, or when it was to be backed, or when a sharp turn had to be made, as in plowing. The animals were liable to step with one or two of their legs over one of such lowered traces, becoming unable thereby to draw the vehicle or implement and frequently getting shy and even running away. The driver had two remedies—either he had to tread upon one of the traces and compel the animal to take its leg or legs back over the same or he had to stoop and unhook the trace from the swingletree and hook it in again, both ways proving rather dangerous and particularly the last-mentioned expedient frequently resulting in serious accidents to the driver, owing to the jerking of the irritated horses.

My invention relates to an improvement in the construction of harness of a very simple nature, such construction supporting the traces so that the draft-animals cannot step over the same, and the troubles and accidents caused thereby will be avoided.

My device is illustrated by the drawings herewith, in which—

Figure 1:
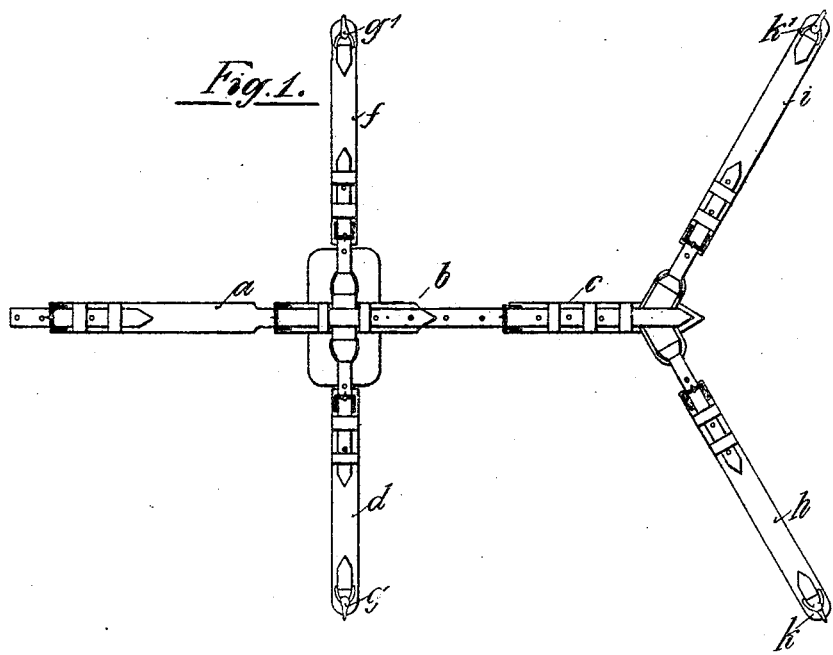
Figure 2:
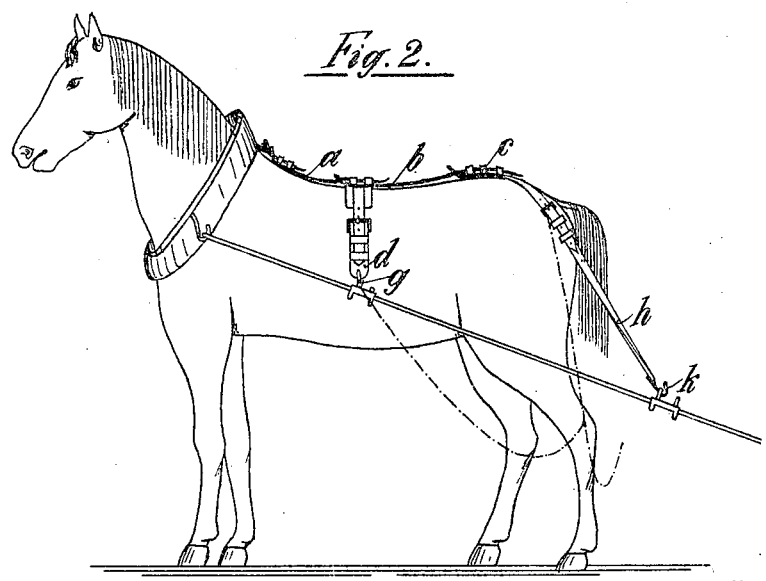

Figure 1 is a top view of a spread harness, while Fig. 2 shows it employed on a horse.

In the embodiment of my invention illustrated on the said drawings there is secured to the collar of the harness a back-strap $a$, which extends by means of further straps $b$ and $c$, secured to the former and to each other in the ordinary way along the back of the animal. From either side of the said piece $b$ or the harness-saddle extend tugs $d$ and $f$, the end of each tug being provided with a trace-hook $g$ $g'$. The end piece $c$ of the back-strap has secured thereon a pair of inclined carriers $h$ $i$, adjustable by buckles and provided each with a hook $k$ $k'$. While when the harness is put on the horse or secured to the collar the aforesaid tugs $d$ and $f$ depend on the sides of the animal, the said carriers $h$ and $i$ pass over the buttocks of the horse or other animal and are hooked each in a hook or eye secured to a slide slotted as usual and embracing the trace, the slotted parts being tightly drawn together by means of suitable screws, being thus made stationary until the said screws are released. Similar adjustable slides are provided on the traces for the receipt of the tugs $d$ and $f$ or their hooks $g$ $g'$. Each of the said slides for the inclined straps or carriers $h$ $i$ is so placed and the length of the latter so adjusted that in the most backward position of the animals the portions of the traces depending in an arch or arches, as indicated by dotted lines in Fig 2, remain high enough above the ground to prevent an animal from getting its legs over the traces.

The adjustability of the several straps of which my harness is composed by buckles or otherwise permits the fitting of the said harness to animals of any size, and the proper position of the slides for the said carriers $h$ $i$, as well as the length of the latter, may be found out in each case when the device is being tried on a horse or other animal.

The aforesaid back-strap need not necessarily consist of three parts, but may be composed only of two pieces, or it may be one long strap, and if a belly-band is used the aforesaid portion $a$ of the back-strap may be omitted altogether.

While in the embodiment of my invention shown on the drawings the tugs and straps $d$ $f$ $h$ $i$ are made of leather, it will do as well if they are made of rope or of any other material, or they may be chains of suitable size. In the latter case the slides may be dispensed with and the length and position of the chains adjusted direct by hooks or loops. The buckles shown on the drawings for the adjustment of the length of the leather straps may be replaced by any contrivance adapted to the material of which the said portions of the harness are made.

My improved harness may be used for any kind of draft-animals and for any kind of vehicles, carts, wagons, ordnance-pieces, plows, and other implements and the like.

I am aware that a breeching is used passing behind the horse's buttocks and attached to the shafts or pole of a carriage; but

What I claim as new, and desire to protect by Letters Patent, is—

1. In a harness the combination with traces, a back-strap, and a pair of tugs hanging down on each side of the animal and connected with the traces, of a pair of carriers extending from the rear end of the back-strap, passing the buttocks of the animal, secured fastly to the traces and being adjustable in length so as to prevent the said traces from extending downward beyond a certain limit, substantially as described and for the purposes set forth.

2. The combination with a harness equipped with traces and a back-strap, of a pair of carriers depending from the rear end of the said back-strap, passing the buttocks of the animal, secured fastly to the traces and being adjustable in length so as to prevent the said traces from extending downward beyond a certain limit, substantially as described and for the purposes set forth.

In testimony whereof I have hereunto signed my name in the presence of two witnesses.

JOHANN SCHREVEN.

Witnesses:
WILLIAM ESSENWEIN,
PETER LIEBER.